(12) United States Patent
Nakamichi

(10) Patent No.: US 12,714,079 B2
(45) Date of Patent: Aug. 25, 2026

(54) LURE

(71) Applicant: Shimano Inc., Sakai (JP)

(72) Inventor: Tadasuke Nakamichi, Sakai (JP)

(73) Assignee: Shimano Inc., Osaka (JP)

( * ) Notice: Subject to any disclaimer, the term of this patent is extended or adjusted under 35 U.S.C. 154(b) by 102 days.

(21) Appl. No.: 17/903,477

(22) Filed: Sep. 6, 2022

(65) Prior Publication Data

US 2023/0165230 A1 Jun. 1, 2023

(30) Foreign Application Priority Data

Nov. 26, 2021 (JP) ................................ 2021-192515

(51) Int. Cl.

*A01K 85/01* (2006.01)
*A01K 85/00* (2006.01)
*A01K 85/16* (2006.01)

(52) U.S. Cl.

CPC .......... *A01K 85/012* (2022.02); *A01K 85/011* (2022.02); *A01K 85/16* (2013.01); *A01K 85/1837* (2022.02); *A01K 85/017* (2022.02)

(58) Field of Classification Search

CPC .... A01K 85/017; A01K 85/01; A01K 85/011; A01K 85/012; A01K 85/013; A01K 85/16; A01K 85/18; A01K 85/1837; A01K 85/1863; A01K 85/00

USPC ........... 43/42.31, 42.32, 42.33, 42.34, 42.39, 43/42.48, 42.02

See application file for complete search history.

(56) References Cited

U.S. PATENT DOCUMENTS 990,984 A * 5/1911 Immell .................. A01K 85/16 43/42.12
1,467,750 A * 9/1923 Borg ...................... A01K 85/16 43/35
2,078,816 A * 4/1937 Shenitz .................. A01K 85/12 43/42.36
2,127,761 A * 8/1938 Beck ...................... A01K 85/16 43/42.33
2,153,489 A * 4/1939 Whitis ................... A01K 85/16 43/17.2
2,204,560 A * 6/1940 Allison .................. A01K 91/10 43/15
2,229,259 A * 1/1941 Sherwood ............. A01K 85/16 43/37

(Continued)

FOREIGN PATENT DOCUMENTS

CN 206760509 U * 12/2017
CN 206866428 U * 1/2018

(Continued)

*Primary Examiner* — Darren W Ark
(74) *Attorney, Agent, or Firm* — Spencer Fane, LLP

(57) ABSTRACT

A lure includes a hollow body including a first half-body and a second half-body joined to the first half-body, an oscillating element disposed in the body so as to be capable of oscillating, a first shaft portion disposed on at least one of the first half-body or the second half-body and extending toward the other of the first half-body or the second half-body, and a first spring including a first engagement portion engaging the first shaft portion such that rotation about the first shaft portion is restricted, and connected to and supporting the oscillating element such that the oscillating element is capable of oscillating.

17 Claims, 14 Drawing Sheets

(56) References Cited

U.S. PATENT DOCUMENTS 2,430,114 A * 11/1947 Helmus .................. A01K 85/16 43/26.2
D153,128 S * 3/1949 Ferris .......................... 43/42.12
2,485,946 A * 10/1949 Watt ...................... A01K 85/02 43/35
2,517,620 A * 8/1950 Anderson ............. A01K 85/12 43/42.33
2,522,808 A * 9/1950 Adams .................. A01K 85/16 43/35
2,530,008 A * 11/1950 Fey ....................... A01K 85/18 43/26.2
2,629,960 A * 2/1953 Baxter .................. A01K 85/16 43/42.12
2,722,764 A * 11/1955 Juhrend ................ A01K 85/02 43/35
2,740,222 A * 4/1956 Velton .................. A01K 83/04 43/42.31
2,752,721 A * 7/1956 Denny .................. A01K 85/16 43/42.34
2,763,087 A * 9/1956 Schnitzer .............. A01K 85/16 43/44.6
2,801,487 A * 8/1957 Morgan ................ A01K 91/10 43/15
2,808,673 A * 10/1957 Coughlin .............. A01K 85/16 43/37
2,884,731 A * 5/1959 Hodgson ............... A01K 85/16 D22/133
2,884,732 A * 5/1959 Bailer .................. A01K 85/16 43/42.33
2,909,863 A * 10/1959 Rector .................. A01K 85/01 43/42.49
2,917,859 A * 12/1959 Troyer .................. A01K 85/12 D22/129
3,006,102 A * 10/1961 Chapman .............. A01K 85/00 43/42
3,037,315 A * 6/1962 Klawitter .............. A01K 85/00 43/17.2
3,069,801 A * 12/1962 Mills ..................... A01K 85/16 43/42.39
3,260,011 A * 7/1966 Reamy .................. A01K 85/16 D22/129
3,314,185 A * 4/1967 Mccoy .................. A01K 91/10 43/15
3,360,882 A * 1/1968 Belokin, Jr. .......... A01K 85/16 D22/126
3,492,753 A * 2/1970 Richard ................ A01K 85/02 43/37
3,916,556 A * 11/1975 Armanno .............. A01K 85/16 43/42.22
4,676,020 A * 6/1987 Taylor ................... A01K 85/01 43/42.35
4,700,504 A * 10/1987 Mattison ............... A01K 85/16 43/42.47
5,832,654 A * 11/1998 McQueeny ........... A01K 85/16 43/42.15
6,202,337 B1 * 3/2001 Yoshida ................ A01K 85/16 43/42.31
6,266,914 B1 * 7/2001 Johnson ................ A01K 85/00 43/42.13
6,671,996 B1 * 1/2004 Ito ........................ A01K 85/16 43/42.31
6,817,137 B1 * 11/2004 Bella ..................... A01K 91/10 43/44.92
7,325,357 B2 * 2/2008 Wiskur ................. A01K 85/01 43/42.31
7,712,245 B1 * 5/2010 Jarboe ................... A01K 85/16 43/42.31
8,402,688 B2 * 3/2013 Choi ..................... A01K 85/01 43/42.34
8,671,612 B1 * 3/2014 Swisher ................ A01K 91/03 43/42.49
8,931,205 B2 * 1/2015 Choi ..................... A01K 85/16 43/42.34
9,661,832 B2 * 5/2017 Scharlé ................. A01K 85/16
11,229,193 B2 * 1/2022 Erickson ............... A01K 85/10
11,439,133 B2 * 9/2022 Nakamichi ........... A01K 85/16
11,716,979 B2 * 8/2023 Yagi ...................... A01K 85/01 43/42
12,010,980 B2 * 6/2024 Nakamichi .......... A01K 85/015
2005/0034349 A1 * 2/2005 Dugger, II ............ A01K 85/01 43/17.1
2015/0264902 A1 * 9/2015 Scharle ................. A01K 85/01 43/42.31
2016/0309687 A1 * 10/2016 Ito ........................ A01K 85/00
2017/0280693 A1 * 10/2017 Lehl ...................... A01K 97/00
2019/0320634 A1 * 10/2019 Kawasaki ............. A01K 85/16
2021/0274762 A1 * 9/2021 Yagi ...................... A01K 85/01
2021/0274763 A1 * 9/2021 Yagi ...................... A01K 85/01
2021/0386043 A1 * 12/2021 Yamane ................ A01K 85/16
2022/0061280 A1 * 3/2022 Nakamichi ........... A01K 85/01
2022/0378027 A1 * 12/2022 Kawasaki .......... A01K 85/1837
2023/0021516 A1 * 1/2023 Nakamichi .......... A01K 85/015
2023/0031006 A1 * 2/2023 Yagi .................... A01K 85/012
2023/0065290 A1 * 3/2023 Yagi .................... A01K 85/013
2023/0122035 A1 * 4/2023 Yagi .................... A01K 85/013 43/42.33
2023/0165229 A1 * 6/2023 Kokuga ............... A01K 85/015 43/17.6
2023/0189776 A1 * 6/2023 Kawasaki .......... A01K 85/1837 43/42.35

FOREIGN PATENT DOCUMENTS

CN 109475110 A * 3/2019 ............. A01K 85/00
CN 210695574 U * 6/2020
CN 211048218 U * 7/2020
CN 112005977 A * 12/2020
CN 112655672 A * 4/2021
CN 112655673 A * 4/2021
CN 112655674 A * 4/2021
CN 213404588 U * 6/2021
CN 113349170 A * 9/2021 ............. A01K 85/00
CN 113349171 A * 9/2021 ............. A01K 85/01
CN 114097722 A * 3/2022 ............. A01K 85/01
CN 216853500 U * 7/2022
CN 114847246 A * 8/2022
CN 217446306 U * 9/2022
CN 115735865 A * 3/2023
DE 202004004551 U1 * 6/2004 ............. A01K 85/16
DE 102019205734 A1 * 10/2019 ............. A01K 85/01
JP 2002034391 A * 2/2002
JP 2003219765 A * 8/2003
JP 2003289759 A * 10/2003
JP 3723778 B2 * 12/2005
JP 2010154762 A * 7/2010
JP 2019187246 A * 10/2019 ............. A01K 85/01
JP 2020191816 A * 12/2020
JP 2021061795 A * 4/2021
JP 2021061797 A * 4/2021
JP 2021061798 A * 4/2021
JP 2021136954 A * 9/2021 ............. A01K 85/00
JP 2021136955 A * 9/2021 ............. A01K 85/00
JP 2023016548 A * 2/2023 ........... A01K 85/015
JP 2023033085 A * 3/2023 ........... A01K 85/012
JP 2023060163 A * 4/2023 ............. A01K 85/00
JP 2023060164 A * 4/2023 ............. A01K 85/00
JP 2024083102 A * 6/2024
KR 20230034130 A * 3/2023
WO WO-0022922 A1 * 4/2000 ............. A01K 85/00

* cited by examiner

LURE

CROSS-REFERENCE TO RELATED APPLICATIONS

This application claims priority to Japanese Patent Application No. 2021-192515, filed on Nov. 26, 2021. The entire disclosure of Japanese Patent Application No. 2021-192515 are hereby incorporated by reference.

BACKGROUND

Field of the Invention

The present disclosure relates to a lure.

Background Art

Some conventional lures contain an oscillating element supported by a spring within a hollow body. For example, in the lure of Laid-Open Patent Application No. 2019-187246, the oscillating element is a reflective plate suspended by a spring inside the body of the lure. The spring extends in the front-rear direction, and the front and rear ends of the spring are fixed to the body.

The oscillations of the oscillating element of such lures act to strongly attract fish-eaters. For example, in the lure of Laid-Open Patent Application No. 2019-187246, even after the lure stops moving, the oscillations of the reflective plate continue, so that the light reflected from the reflective plate appears to shimmer. This has the effect of strongly attracting fish-eaters.

SUMMARY

In some lures, a first half-body and a second half-body are joined together to form the body of the lure. In such lures, if the above-mentioned oscillating element and spring are provided, the spring may move when the body is joined, causing the oscillating element to occupy a position closer to the body than to the appropriate design position. In this case, the body tends to interfere with the oscillations of the oscillating element. If the body interferes with the oscillating element, the oscillations of the oscillating element will be hindered, and it will be difficult for the oscillating element to sufficiently fulfill its function.

An object of the present disclosure is to provide a lure that prevents the hindering of the oscillations of the oscillating element due to the shifted position of the oscillating element when the body is joined.

The lure according to one aspect of the present disclosure includes a body, an oscillating element, a first shaft portion, and a first spring. The body is hollow. The body includes a first half-body and a second half-body. The second half-body is joined to the first half-body. The oscillating element is disposed in the body so as to be capable of oscillating. The first shaft portion is provided on at least one of the first half-body and the second half-body. The first shaft portion extends toward the other half-body, i.e., the second half-body or the first half-body, respectively. The first spring is connected to the oscillating element. The oscillating element is supported by the first spring so as to be capable of oscillating. The first spring includes a first engagement portion. The first engagement portion engages the first shaft portion such that rotation about the first shaft portion is restricted.

The lure can further comprise a second shaft portion and a second spring. The second shaft portion may be disposed on at least one of the first half-body and the second half-body. The second shaft portion can extend toward the other half-body, i.e., the second half-body or the first half-body, respectively. The second spring can be connected to the oscillating element. The oscillating element is supported by the second spring so as to be capable of oscillating. The second spring can include a second engagement portion, which can engage the second shaft portion such that rotation around the second shaft portion is restricted.

The first spring can extend in a first direction, and the second spring can extend in a second direction. The first direction and the second direction can be arranged non-orthogonally.

The winding direction of the second spring can be the same as that of the first spring, or the winding direction of the second spring can be opposite to that of the first spring.

The oscillating element can be supported by the first spring and the second spring so as to be capable of oscillating, such that the time required for one oscillation is a period of at least 0.1 seconds.

The first engagement portion can be disposed in front of the oscillating element, or the second engagement portion can be disposed behind the oscillating element.

The first engagement portion can be disposed above the oscillating element, or the second engagement portion can be disposed below the oscillating element.

The lure may further comprise a weight, and/or the weight can be attached to the oscillating element.

The oscillating element can include a hole. The lure can further comprise a protrusion that can be disposed in the body. The protrusion can be disposed through the hole, and/or the protrusion can be separated from the edge of the hole when the oscillating element is stationary.

The first shaft portion can include a flat surface, and the first engagement portion can include a straight portion. In some embodiments, the straight portion can be in contact with the flat surface.

The first shaft portion and/or the first engagement portion can have a polygonal shape, for example, the first shaft portion and/or the first engagement portion can have a rectangular shape.

The first shaft portion can include a main shaft portion and an auxiliary shaft portion, and the auxiliary shaft portion can be positioned away from the main shaft portion. The first engagement portion can include a main engagement portion and an auxiliary engagement portion. The main engagement portion can engage the main shaft portion, and/or the auxiliary engagement portion can be connected to the main engagement portion. The auxiliary engagement portion can come in contact with the auxiliary shaft portion to stop the rotation of the main engagement portion with respect to the main shaft portion.

The lure can further comprise a weight part and a biasing element. In some embodiments, the weight part can be disposed inside the body, and/or the weight part can be movable relative to the body. The biasing element can elastically deform as the weight part moves, and the biasing element can bias the weight part by elastic restoring deformation. The weight part can move so as to elastically deform the biasing element, at least during casting.

The body can include a first body portion, a second body portion, and a connecting portion. The second body portion can be separate from the first body portion, and the connecting portion can connect the first body portion and the second body portion.

The body can at least partially transmit light. The oscillating element can be capable of reflecting light. The first half-body and the second half-body can be joined together by welding.

By the lure according to one aspect of the present disclosure, the first spring engages with the first shaft portion such that rotation about the first shaft portion is restricted at the first engagement portion. Therefore, when the body is joined, the movement of the first spring is restricted, thereby preventing the oscillating element from being displaced from the appropriate design position. Thus, hindering of the oscillations of the oscillating element due to interference between the oscillating element and the body can be prevented.

DETAILED DESCRIPTION OF EMBODIMENTS

Figure 1:
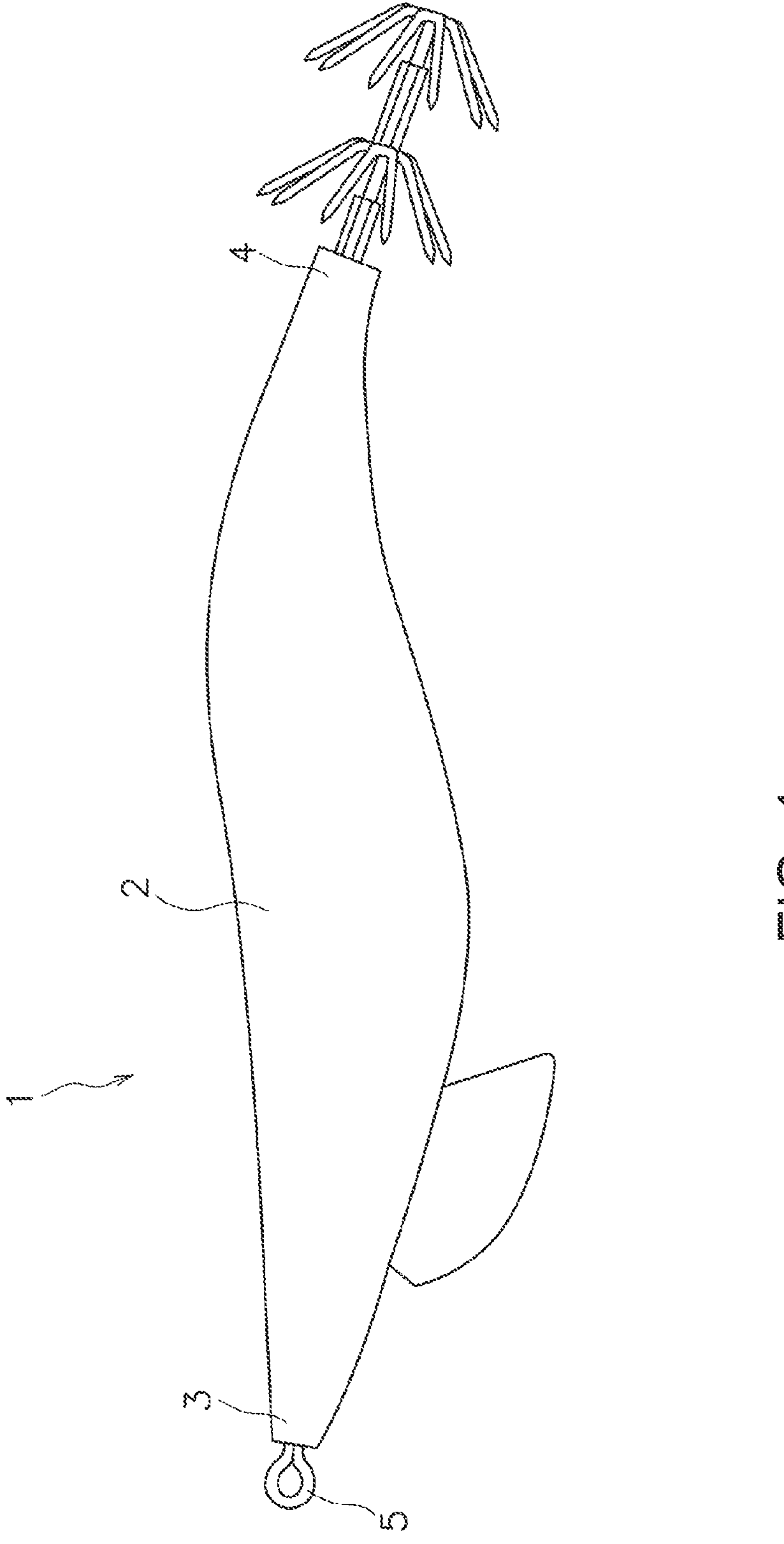
FIG. 1 is a side view of the lure according to an embodiment.
Figure 2:
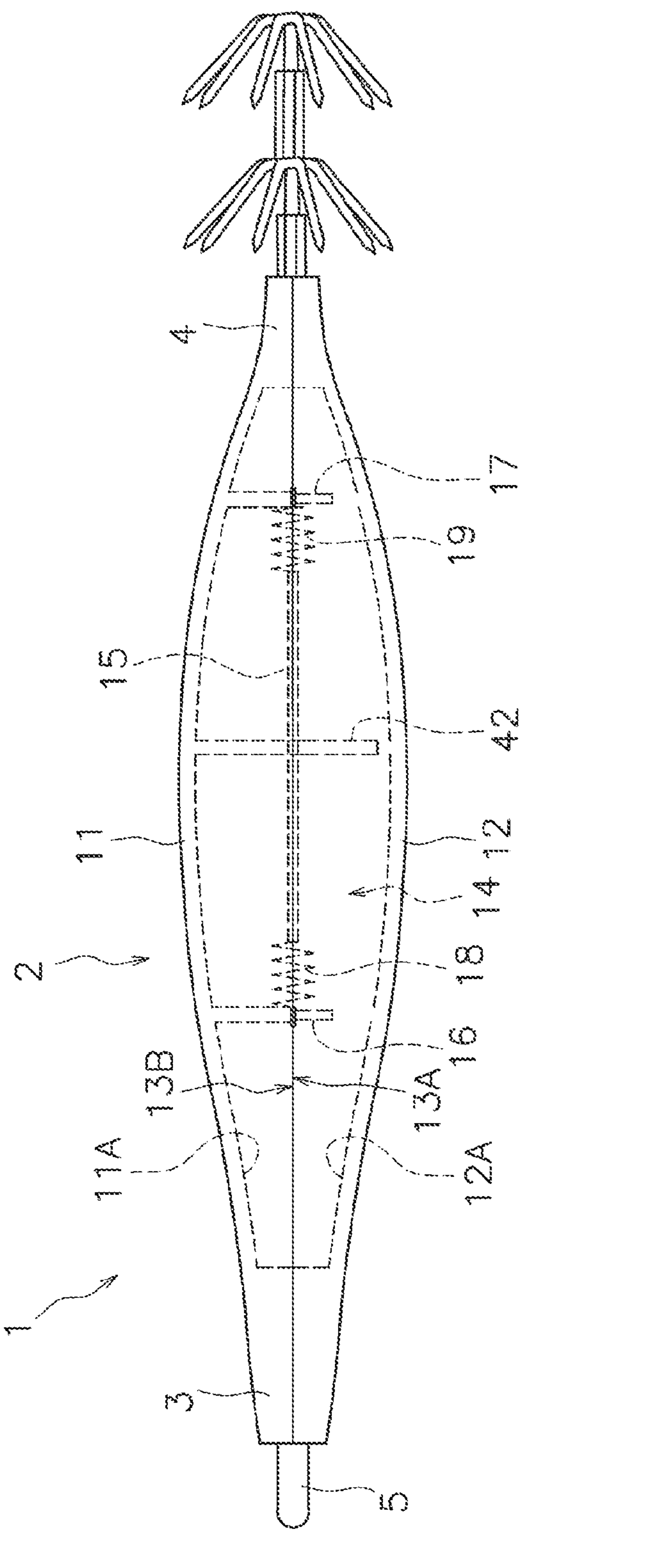
FIG. 2 is a top view of the lure according to the embodiment.

A lure according to an embodiment will be described below with reference to the drawings. FIG. 1 is a side view of a lure 1 according to the embodiment. FIG. 2 is a top view of the lure 1 according to the embodiment. As shown in FIGS. 1 and 2, the lure 1 includes a body 2. The body 2 includes a head portion 3 and a tail portion 4. A fishing line connection part 5 for tying a fishing line is attached to the head portion 3.

In this Specification, the terms indicating the directions "front," "rear," "forward," "backward," "left," "right," "lateral," "upper," and "lower," as well as any other similar directions, are based on, when the lure 1 is connected to a fishing line and the lure 1 travels forward in the water, designating the direction in which the lure 1 is being pulled by the fishing line and is advancing as the "front" and "forward," the direction toward the water surface as "upper," and the direction toward the bottom of the water as "lower."

As shown in FIG. 2, the body 2 includes a first half-body 11 and a second half-body 12. The body 2 is divided into the first and second half-bodies, 11 and 12, respectively, on the left and right sides. The first half-body 11 and the second half-body 12 are made of resin. The first half-body 11 and the second half-body 12 are separate bodies and are joined together by welding. For example, the first half-body 11 and the second half-body 12 are joined together by means of welding.

The first half-body 11 includes a joining surface 13A. The second half-body 12 has a joining surface 13B. Thus, the first half-body 11 and the second half-body 12 are joined together at the joining surfaces 13A, 13B. The joining surfaces 13A, 13B extend in the front-rear direction. The body 2 is hollow and has an internal space 14.

Figure 3:
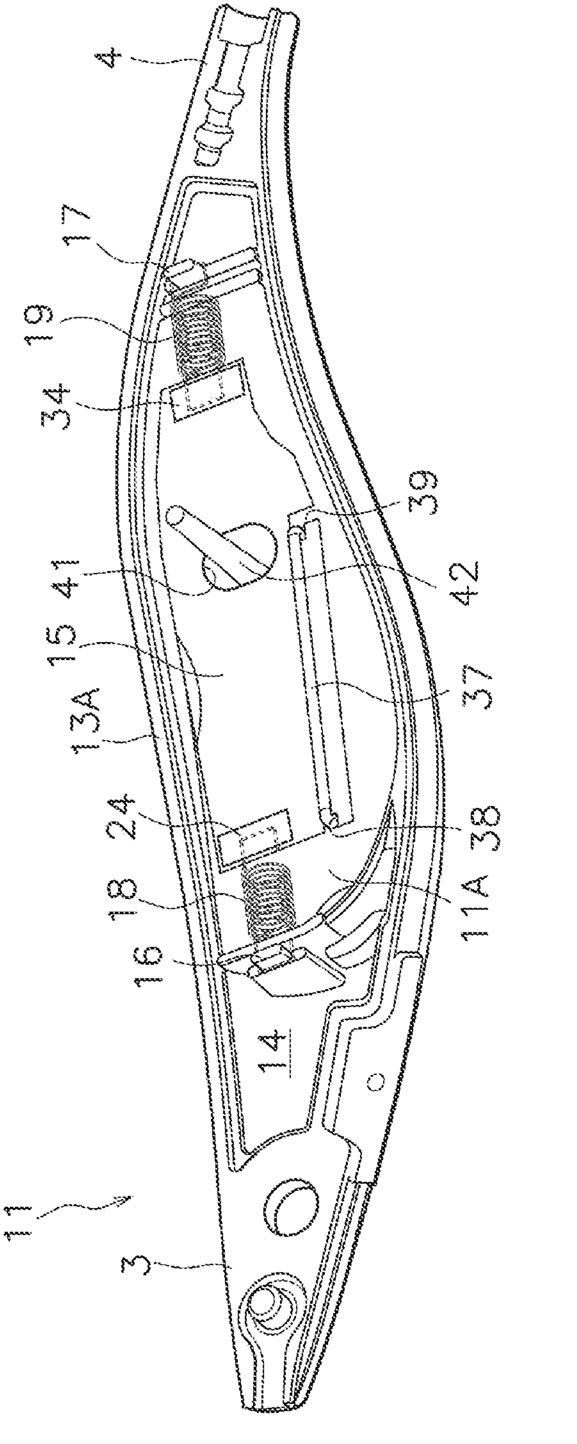
FIG. 3 is a perspective view of a first half-body.
Figure 4:
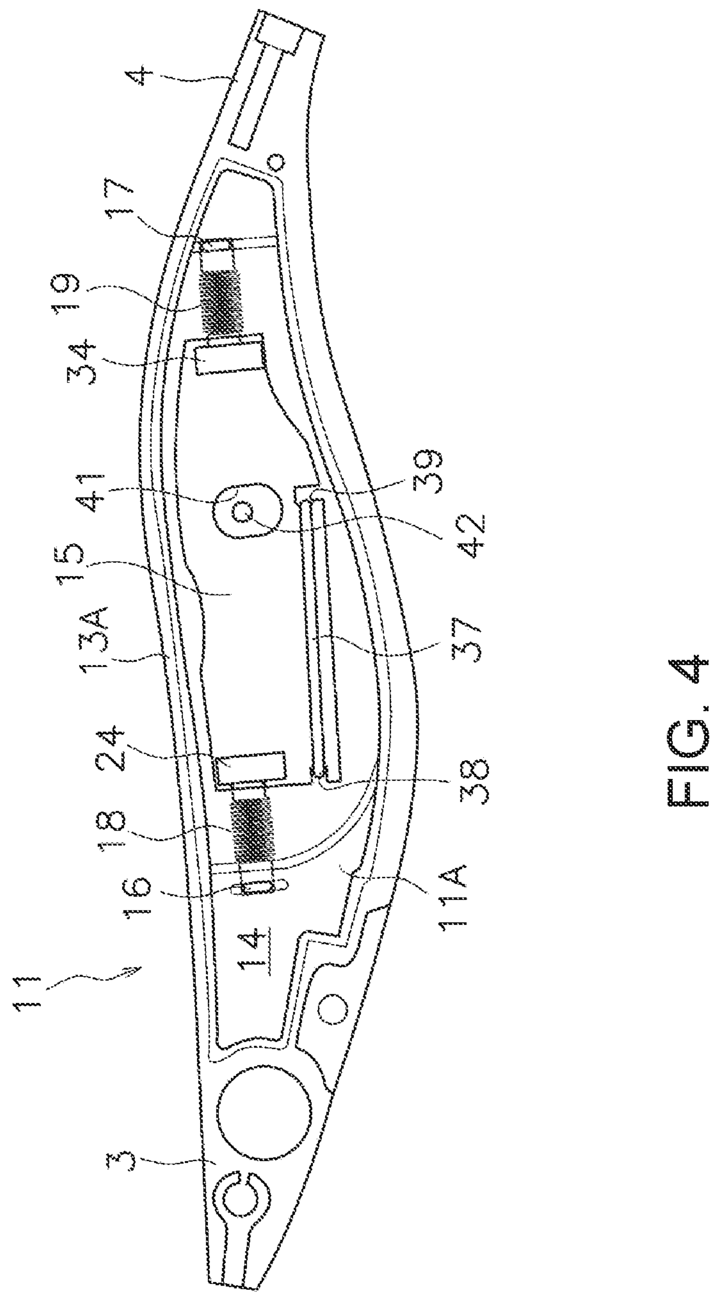
FIG. 4 is a side view of the first half-body.

FIG. 3 is a perspective view of the first half-body 11, and FIG. 4 is a side view of the first half-body 11. As shown in FIGS. 2 to 4, the lure 1 includes an oscillating element 15, a first shaft portion 16, a second shaft portion 17, a first spring 18, and a second spring 19. The oscillating element 15, the first shaft portion 16, the first spring 18, the second shaft portion 17, and the second spring 19 are arranged in the internal space 14 of the body 2. The oscillating element 15 is disposed in the body 2 so as to be able to oscillate The oscillating element 15 is formed from a metal plate. Alternatively, the oscillating element 15 can be formed from another material, such as resin. The oscillating element 15 can reflect light. For example, in one embodiment, a mirror-surface treatment such as plating or a holographic treatment is applied to the surface of the oscillating element 15. At least part of the body 2 facing the oscillating element 15 is transparent. The body 2 thereby transmits light reflected by the oscillating element 15.

The first shaft portion 16 can be connected to an inner surface 11A of the first half-body 11 and extends toward the second half-body 12. Alternatively, the first shaft portion 16 can be connected to an inner surface 12A of the second half-body 12 and extends toward the first half-body 11. The first shaft portion 16 extends in the left-right direction of the lure 1. The first shaft portion 16 is arranged in front of the oscillating element 15.

The second shaft portion 17 is connected to the inner surface 11A of the first half-body 11 and extends toward the second half-body 12. Alternatively, the second shaft portion 17 can be connected to an inner surface 12A of the second half-body 12 and extend toward the first half-body 11. The second shaft portion 17 extends in the left-right direction of the lure 1. The second shaft portion 17 is arranged behind the oscillating element 15.

Figure 5:
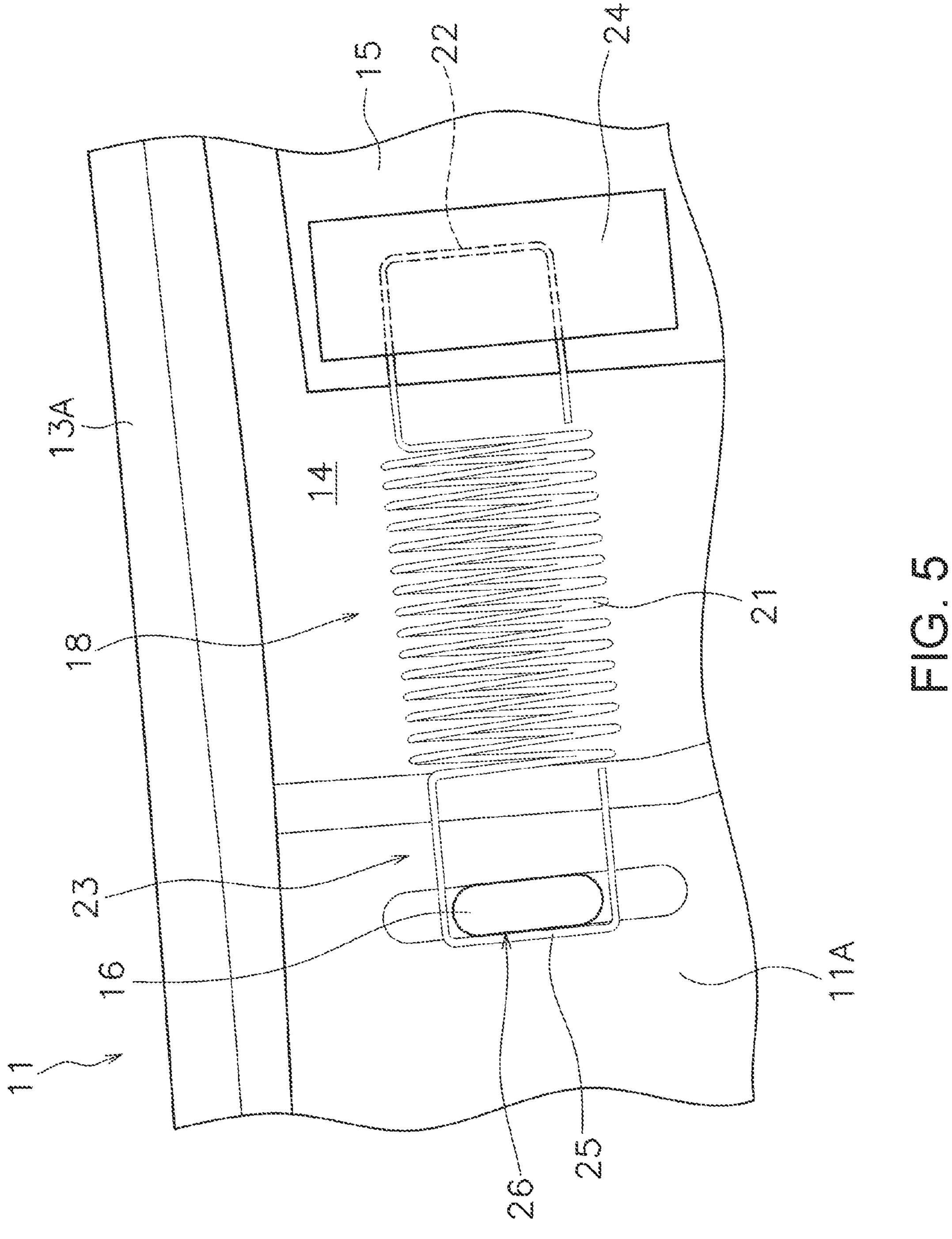
FIG. 5 is an enlarged side view of a first spring and its surroundings.

The first spring 18 is arranged in front of the oscillating element 15. The first spring 18 is connected to the oscillating element 15. The oscillating element 15 is supported by the first spring 18 so as to be capable of oscillating. FIG. 5 is an enlarged side view of the first spring 18 and its surroundings. As shown in FIG. 5, the first spring 18 includes a first coil portion 21, a first fixed portion 22, and a first engagement portion 23.

The first coil portion 21 is positioned between the first fixed portion 22 and the first engagement portion 23. The first fixed portion 22 is arranged behind the first coil portion 21. The first fixed portion 22 is fixed to the oscillating element 15. The first fixed portion 22 has a bent shape. The first fixed portion 22 has a rectangular shape. The first fixed portion 22 is fixed to a side surface of the oscillating element 15. The first fixed portion 22 is fixed to the oscillating element 15 by a first mounting plate 24. The oscillating element 15 is thus fixed to the first fixed portion 22 such that rotation about the first fixed portion 22 is restricted.

The first engagement portion 23 is arranged in front of the first coil portion 21, and engages the first shaft portion 16. The first engagement portion 23 has the form of wire material bent into the shape of a hook, and is rectangular in shape. The first engagement portion 23 includes a first straight portion 25, which extends in the up-down direction. The first straight portion 25 is located in front of the first shaft portion 16.

The first shaft portion 16 has a shape that extends in the up-down direction, and includes a first flat surface 26. The first flat surface 26 extends in the up-down direction. The first straight portion 25 is arranged along the first flat surface 26 and is in contact with the first flat surface 26. As a result, the first engagement portion 23 engages the first shaft portion 16 such that the rotation about the first shaft portion 16 is restricted.

The second spring 19 is arranged behind the oscillating element 15, and is connected to the oscillating element 15. The oscillating element 15 is supported by the second spring 19 so as to be capable of oscillating. The winding directions of the second spring 19 and the first spring 18 are the same. For example, the first spring 18 and the second spring 19 are wound clockwise from front to back. Alternatively, the first spring 18 and the second spring 19 can be wound counter-clockwise from front to back.

Figure 6:
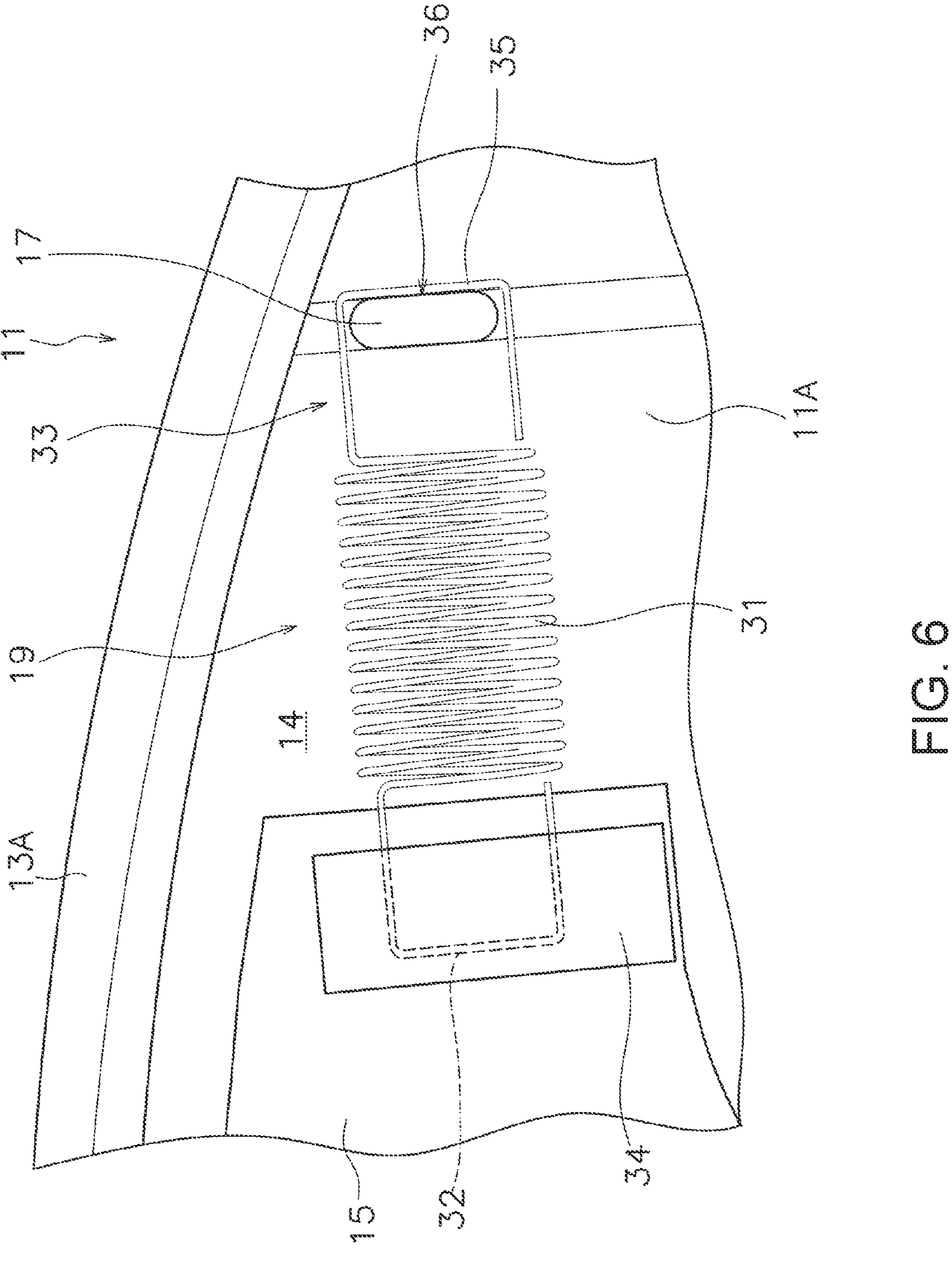
FIG. 6 is an enlarged side view of a second spring and its surroundings.

FIG. 6 is an enlarged side view of the second spring 19 and its surroundings. As shown in FIG. 6, the second spring 19 includes a second coil portion 31, a second fixed portion 32, and a second engagement portion 33. The second coil portion 31 is positioned between the second fixed portion 32 and the second engagement portion 33. The second fixed portion 32 is arranged in front of the second coil portion 31, and is fixed to the oscillating element 15. The second fixed portion 32 has a bent shape, which can be rectangular in shape. The second fixed portion 32 is fixed to a side surface of the oscillating element 15, for example, the second fixed portion 32 can be fixed to the oscillating element 15 by a second mounting plate 34. The oscillating element 15 is thus fixed to the second fixed portion 32 such that the rotation about the second fixed portion 32 is restricted.

The second engagement portion 33 is arranged behind the second coil portion 31, and engages the second shaft portion 17. The second engagement portion 33 is formed from wire material bent into the shape of a hook. The second engagement portion 33 is rectangular shape, and includes a second straight portion 35. The second straight portion 35 extends in the up-down direction, and is located in front of the second shaft portion 17.

The second shaft portion 17 has a shape that extends in the up-down direction. The second shaft portion 17 includes a second flat surface 36 that extends in the up-down direction. The second straight portion 35 is arranged along the second flat surface 36 and is in contact with the second flat surface 36. As a result, the second engagement portion 33 engages the second shaft portion 17 such that the rotation about the second shaft portion 17 is restricted.

The first spring 18 extends in a first direction, and the second spring 19 extends in a second direction. The first direction and the second direction are arranged non-orthogonally, and in one embodiment, the first direction and the second direction are disposed approximately parallel to each other. In this embodiment, the first direction and the second direction are approximately coincident with the front-rear direction of the lure 1. However, the first direction and the second direction need not be exactly parallel to each other.

As shown in FIG. 4, the lure 1 includes a weight 37. The weight 37 is attached to the oscillating element 15, and has a shape that extends in the front-rear direction. The weight 37 is arranged below the first spring 18 and the second spring 19. The oscillating element 15 includes a first notch 38 and a second notch 39, the first notch 38 recessed rearward from the front edge of the oscillating element 15, and the second notch 39 arranged behind the first notch 38. The second notch 39 is recessed upward from the lower edge of the oscillating element 15. The weight 37 is attached to the first notch 38 and the second notch 39.

The oscillating element 15 is supported in a floating state by the first spring 18 and the second spring 19 so as to be capable of oscillating. When the oscillating element 15 moves due to the landing of the lure 1 on the water or because the lure 1 is being moved, the first spring 18 and the second spring 19 elastically deform. The oscillating element 15 then moves in the opposite direction due to the elastic force of the first spring 18 and the second spring 19. By repeating the operation described above, the oscillating element 15 continuously oscillates due to the elastic force of the first spring 18 and the second spring 19, even after the lure 1 is stationary.

The oscillating element 15 is supported by the first spring 18 and the second spring 19 so as to be capable of oscillating without coming in contact with the body 2. Thus, the loss of oscillatory energy due to the collisions of the oscillating element 15 with the inner surface of the body 2 can be suppressed. This ensures oscillations of the oscillating element 15 of a long duration, even when the lure 1 is stationary after the lure 1 lands on water, or after the lure 1 has moved.

Preferably, the oscillating element 15 is capable of oscillating one or more times to the left and right after the lure 1 has become stationary. Preferably, the oscillating element 15 is supported by the first spring 18 and the second spring 19 such that the time required for one oscillation of the oscillating element 15 is a period of 0.1 seconds or more. That is, the frequency of the oscillating element 15 is preferably 10 Hz or less. The frequency of the oscillating element 15 is preferably above 2 Hz. For example, the frequency of the oscillating element 15 is about 6 Hz. However, the frequency of the oscillating element 15 is not limited to these values and may be changed.

The oscillating element 15 includes a hole 41. The hole 41 passes through the oscillating element 15 in the left-right direction. The body 2 includes a protrusion 42. The protrusion 42 is disposed in the internal space 14 of the body 2. The protrusion 42 extends in the left-right direction. The protrusion 42 extends from the first half-body 11 toward the second half-body 12. Alternatively, the protrusion 42 can extend from the second half-body 12 toward the first half-body 11. The protrusion 42 is disposed through the hole 41. When the oscillating element 15 is stationary, the protrusion 42 is separated from the edge of the hole 41. The diameter of the hole 41 is set such that at over-excursions of the oscillating element 15, the protrusion 42 and the edge of the hole 41 come in contact and thereby suppress the excursion of the oscillating element 15.

By the lure 1 according to the present disclosure, the first spring 18 engages the first shaft portion 16 such that rotation about the first shaft portion 16 is restricted in the first engagement portion 23. The vertical movement of the first spring 18 is thus restricted when the body 2 is joined. In regard to the second spring 19, the vertical movement of the second spring 19 is restricted in similar fashion to the first spring 18 when the body 2 is joined. Thus, in the lure 1 according to this embodiment, the oscillating element 15 can be prevented from being displaced from the appropriate design position when the first half-body 11 and the second half-body 12 are joined together. Therefore, the oscillations of the oscillating element 15 can be prevented from being hindered due to interference between the oscillating element 15 and the body 2.

One embodiment of the present invention was described above, but the present invention is not limited to the above-described embodiment, and various modifications can be made without departing from the scope of the invention.

The shapes of the first spring 18 and the second spring 19 are not limited to the embodiment described above, but can be changed. For example, the first spring 18 and the second spring 19 can have opposite winding directions. For example, the first spring 18 can be wound clockwise from front to back, and the second spring 19 can be wound counterclockwise from front to back. Alternatively, the second spring 19 can be wound clockwise from front to back, and the first spring 18 can be wound counterclockwise from front to back.

Figure 7:
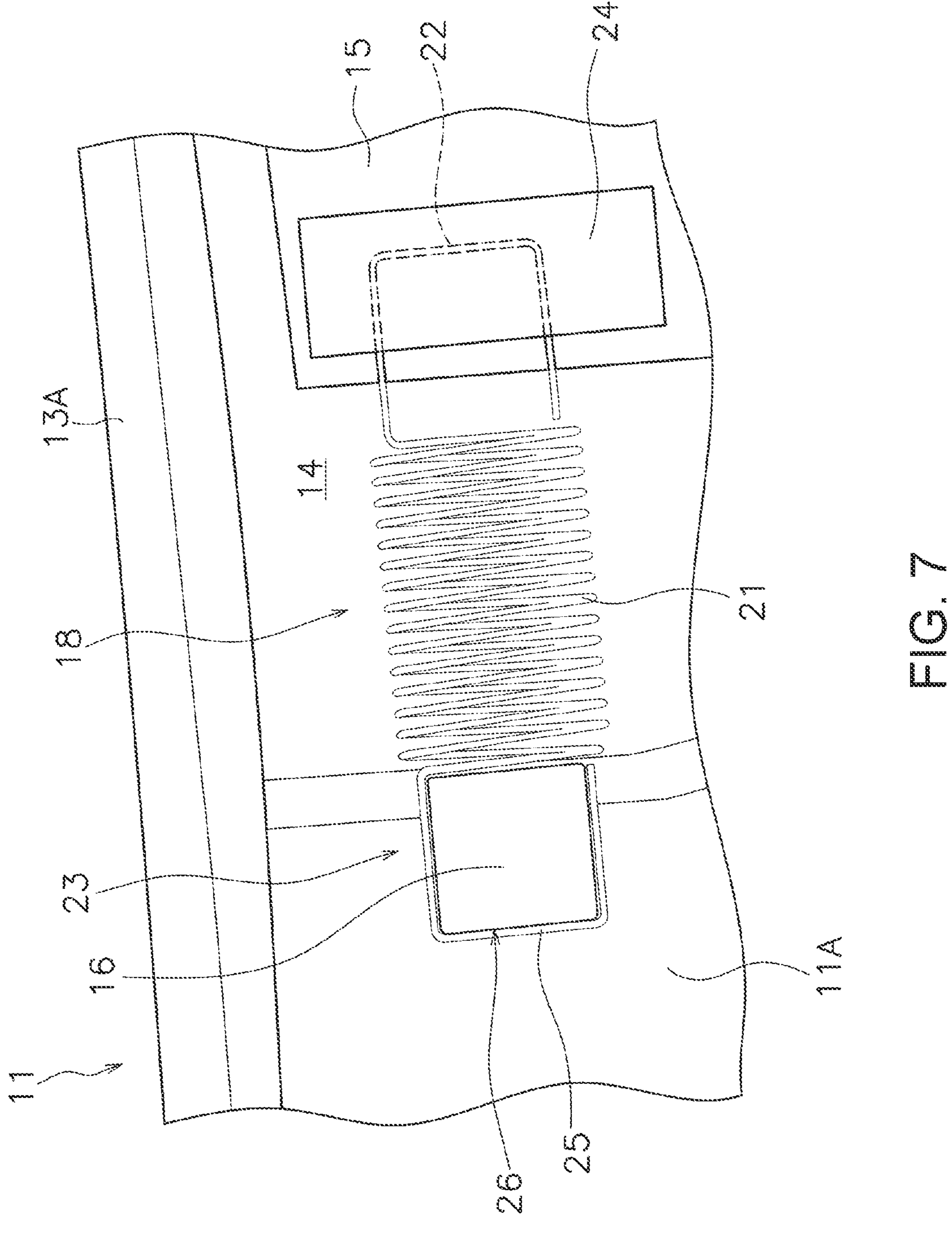
FIG. 7 is a side view of the interior of the lure according to a first modified example.

The shapes of the first engagement portion 23, the first shaft portion 16, the second engagement portion 33, and the second shaft portion 17 are not limited to the embodiment described above, but can be changed. FIG. 7 is a side view showing the interior of the lure 1 according to a first modified example. As shown in FIG. 7, the first shaft portion 16 can be rectangular in shape. Similarly to the first shaft portion 16, the second shaft portion 17 can be rectangular in shape.

Figure 8:
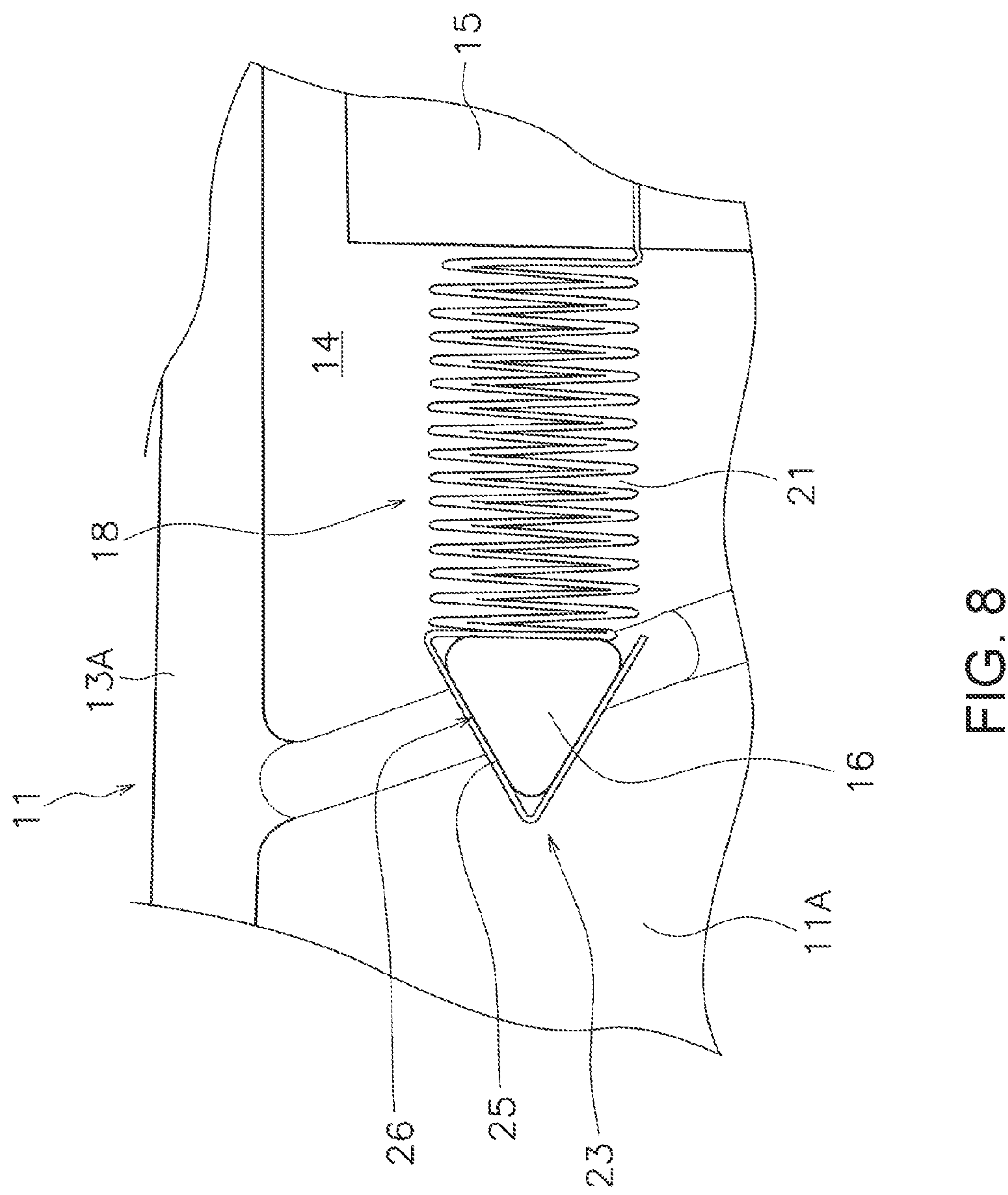
FIG. 8 is a side view of the interior of the lure according to a second modified example.

FIG. 8 is a side view showing the interior of the lure 1 according to a second modified example. As shown in FIG. 8, the first shaft portion 16 can be triangular in shape. Similarly to the first shaft portion 16, the second shaft portion 17 can also be triangular in shape. Further, as shown in FIG. 8, the first engagement portion 23 can be triangular in shape. In the same manner as the first engagement portion 23, the second engagement portion 33 can also be triangular in shape.

Figure 9:
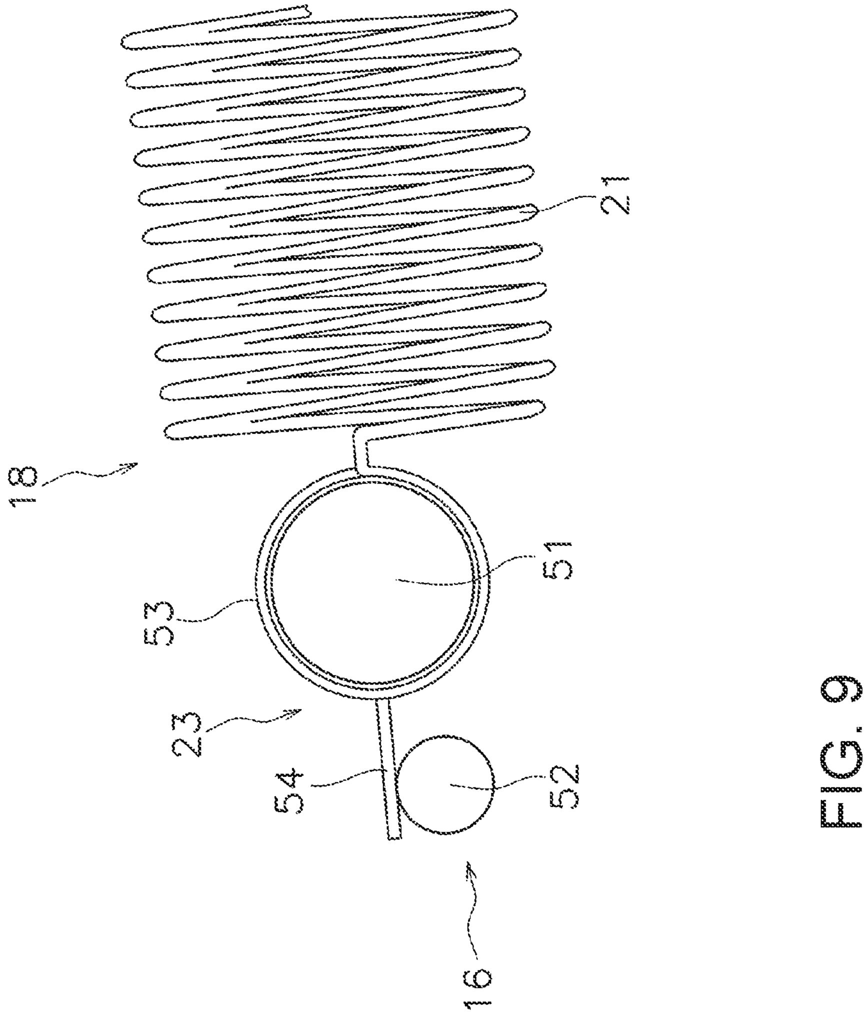
FIG. 9 is a side view of the interior of the lure according to a third modified example.

FIG. 9 is a side view showing the interior of the lure 1 according to a third modified example. As shown in FIG. 9, the first shaft portion 16 includes a main shaft portion 51 and an auxiliary shaft portion 52. The auxiliary shaft portion 52 is disposed away from the main shaft portion 51. The first engagement portion 23 includes a main engagement portion 53 and an auxiliary engagement portion 54. The main engagement portion 53 engages the main shaft portion 51.

The auxiliary engagement portion 54 is connected to the main engagement portion 53. The main engagement portion 53, the main shaft portion 51, and the auxiliary shaft portion 52 are circular in shape. However, the auxiliary shaft portion 52 can have a polygonal shape, such as rectangular or triangular. The auxiliary engagement portion 54 has a linear shape. The auxiliary engagement portion 54 contacts the auxiliary shaft portion 52 to arrest the rotation of the main engagement portion 53 with respect to the main shaft portion 51.

Figure 10:
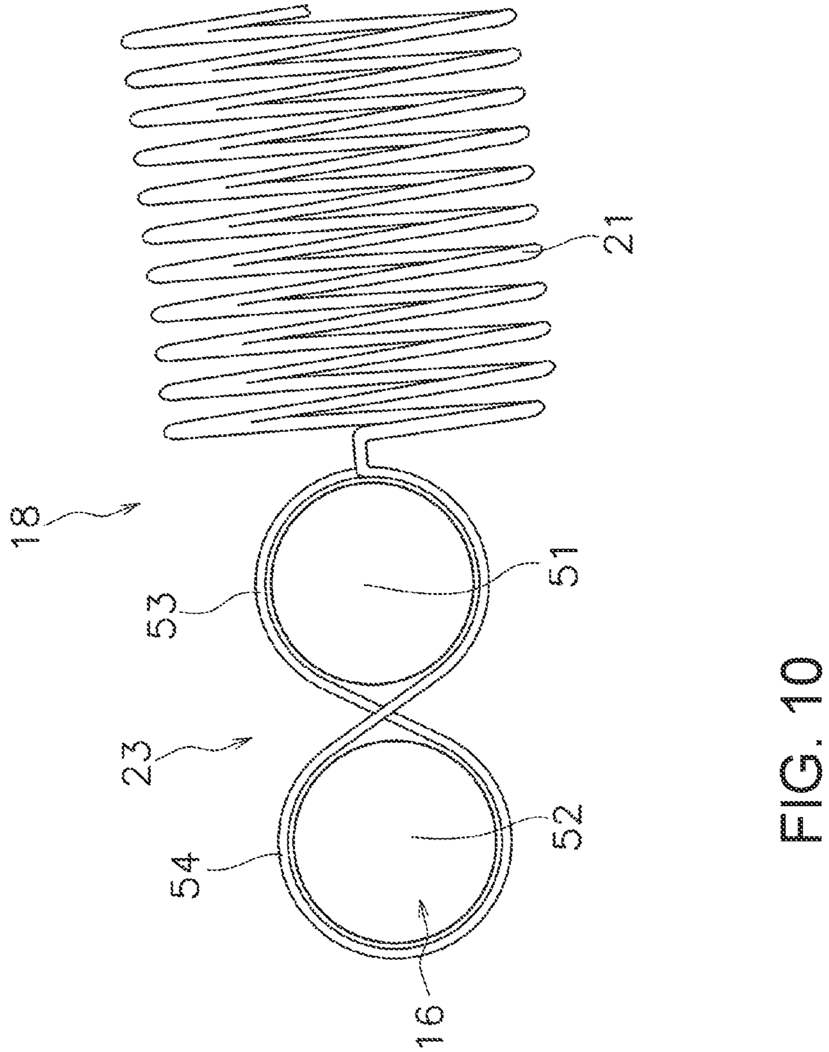
FIG. 10 is a side view of the interior of the lure according to a fourth modified example.

FIG. 10 is a side view showing the interior of the lure 1 according to a fourth modified example. As shown in FIG. 10, the auxiliary engagement portion 54 can be circular in shape.

Figure 11:
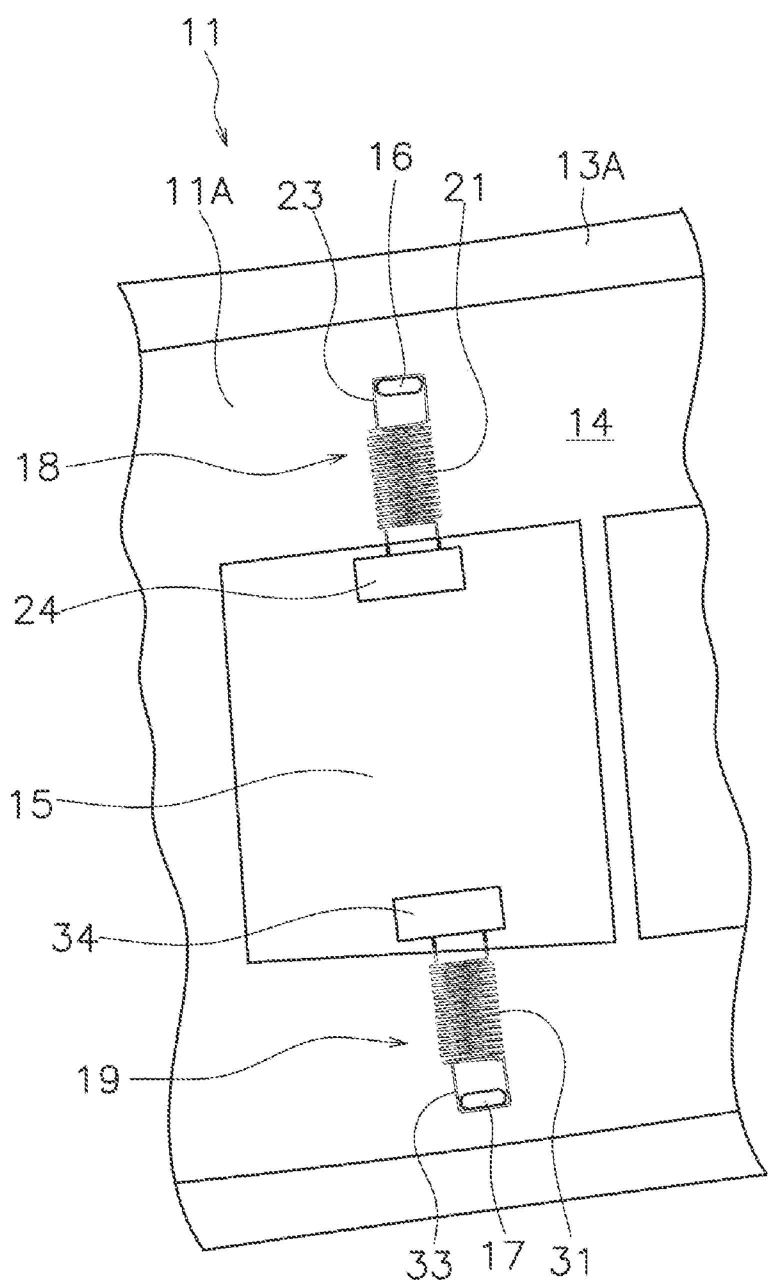
FIG. 11 is a side view of the interior of the lure according to a fifth modified example.

FIG. 11 is a side view showing the interior of the lure 1 according to a fifth modified example. As shown in FIG. 11, the first spring 18 can be arranged above the oscillating element 15. The second spring 19 can be arranged below the oscillating element 15. In this embodiment, the first shaft portion 16 and the first engagement portion 23 can be arranged above the oscillating element 15, and the second shaft portion 17 and the second engagement portion 33 can be arranged below the oscillating element 15. The lure 1 can include a plurality of oscillating bodies 15. The plurality of oscillating bodies 15 can be arranged side by side in the front-rear direction.

Figure 12:
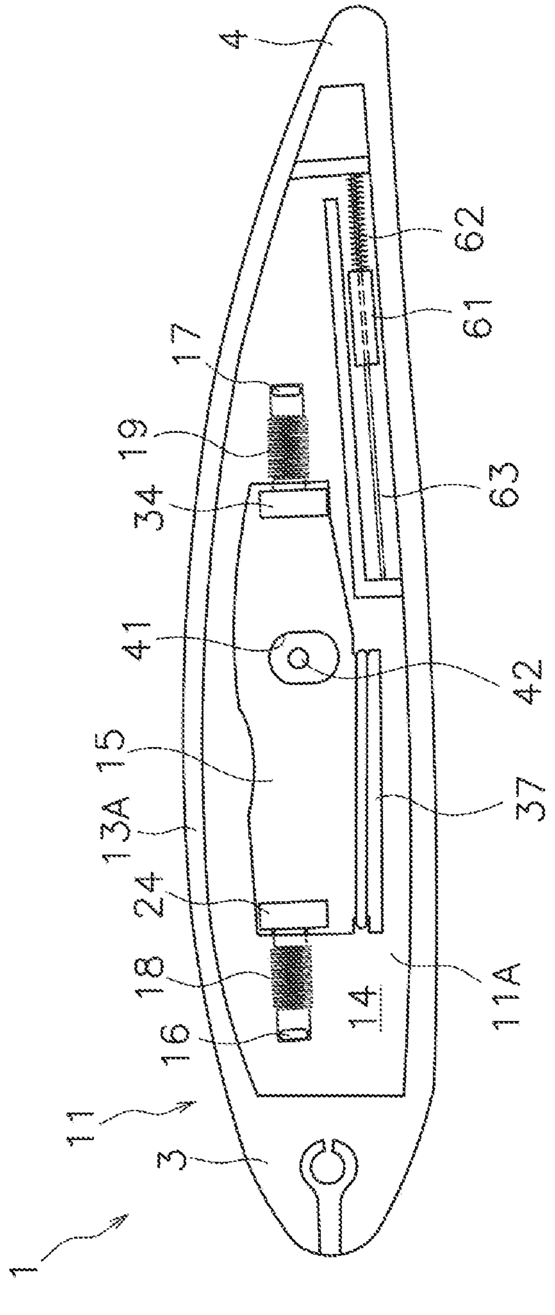
FIG. 12 is a side view of the interior of the lure according to a sixth modified example.

FIG. 12 is a side view showing the interior of the lure 1 according to a sixth modified example. As shown in FIG. 12, the lure 1 according to the sixth modified example has a weight part 61 and a biasing element 62. The weight part 61 is disposed in the internal space 14 of the body 2, and can move relative to the body 2. Specifically, a guide element 63 is disposed in the body 2, so as to extend in the front-rear direction. The weight part 61 can move back and forth along the guide element 63 to thereby change the center of gravity of the lure 1.

The biasing element 62 is connected to the weight part 61, and is disposed behind the weight part 61. The biasing element 62 is, for example, a spring. The biasing element 62 elastically deforms as the weight part 61 moves. The biasing element 62 biases the weight part 61 by elastic restoring deformation. The weight part 61 moves so as to elastically deform the biasing element 62, at least during the casting the lure 1 toward the surface of the water.

The lure 1 according to the sixth modified example, when cast, flies with the tail portion 4 in front. During the flight of the lure 1, the weight part 61 moves toward the tail portion 4 while compressing the biasing element 62 due to inertia. As a result, during flight, the center of gravity of the lure 1 is located on the tail portion 4, thereby producing a longer flying distance. When the lure 1 lands on the water, the weight part 61 is pushed back to the head portion 3 side by the elastic force of the biasing element 62. As a result, the center of gravity of the lure 1 moves into a position in which an appropriate underwater posture or underwater behavior can be obtained. As described above, in the lure 1 according to the fifth modified example, the weight part 61 shifts position between the times the lure is in flight and underwater; thus, the center of gravity of the lure 1 can move into the appropriate position.

Figure 13:
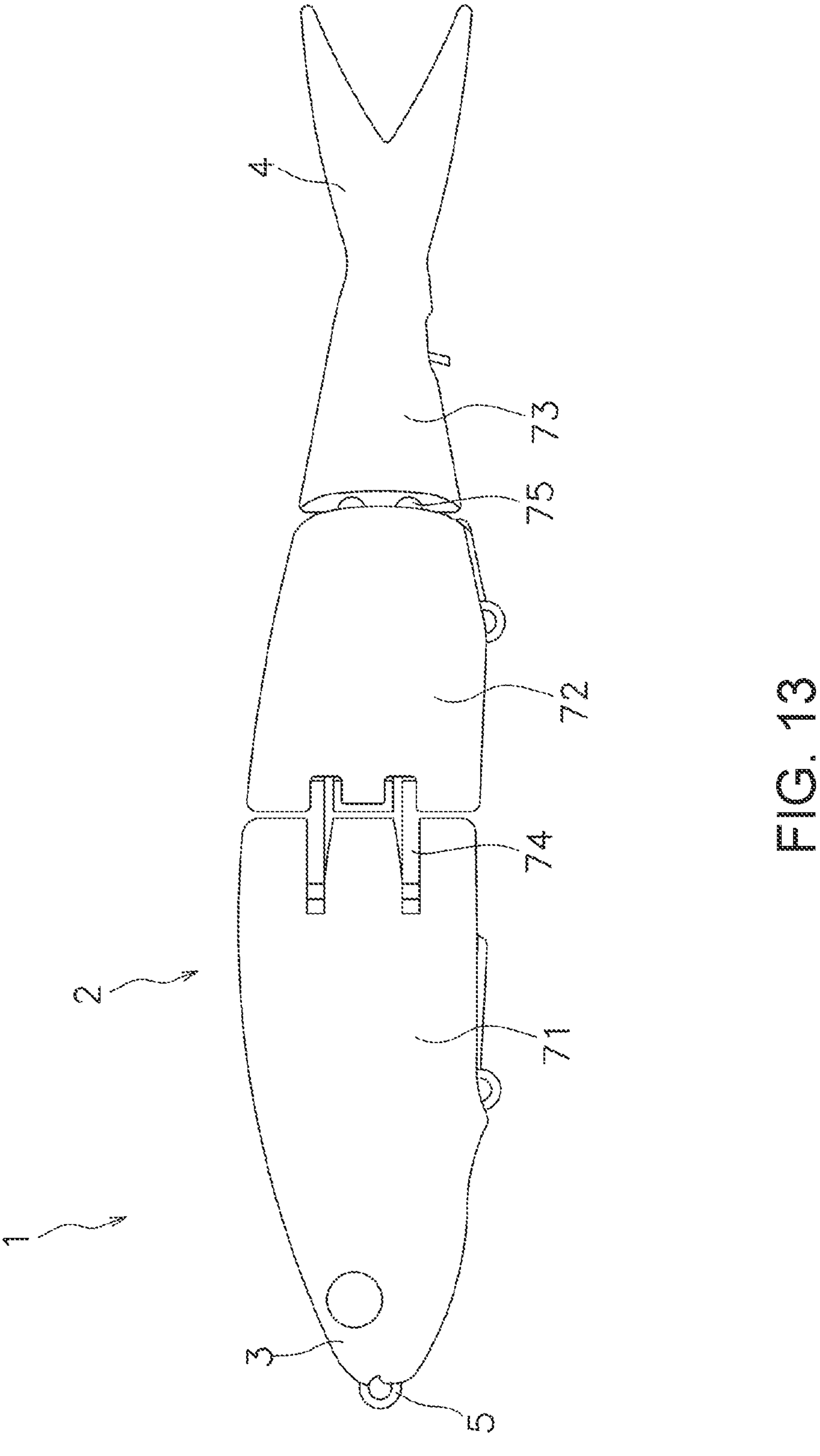
FIG. 13 is a side view of the interior of the lure according to a seventh modified example.

FIG. 13 is a side view showing the interior of the lure 1 according to a seventh modified example. As shown in FIG. 13, in the lure 1 according to the seventh modified example, the body 2 includes a first body portion 71, a second body portion 72, a third body portion 73, a first connecting portion 74, and a second connecting portion 75. The first body portion 71, the second body portion 72, and the third body portion 73 are separate bodies.

The first connecting portion 74 connects the first body portion 71 and the second body portion 72 such that the first body portion 71 and the second body portion 72 can both oscillate. In one embodiment, the first body portion 71 and the second body portion 72 can both oscillate to the left and right. The second connecting portion 75 connects the second body portion 72 and the third body portion 73 such that the second body portion 72 and the third body portion 73 can both oscillate. In one embodiment, the second body portion 72 and the third body portion 73 can both oscillate to the left and right.

Figure 14:
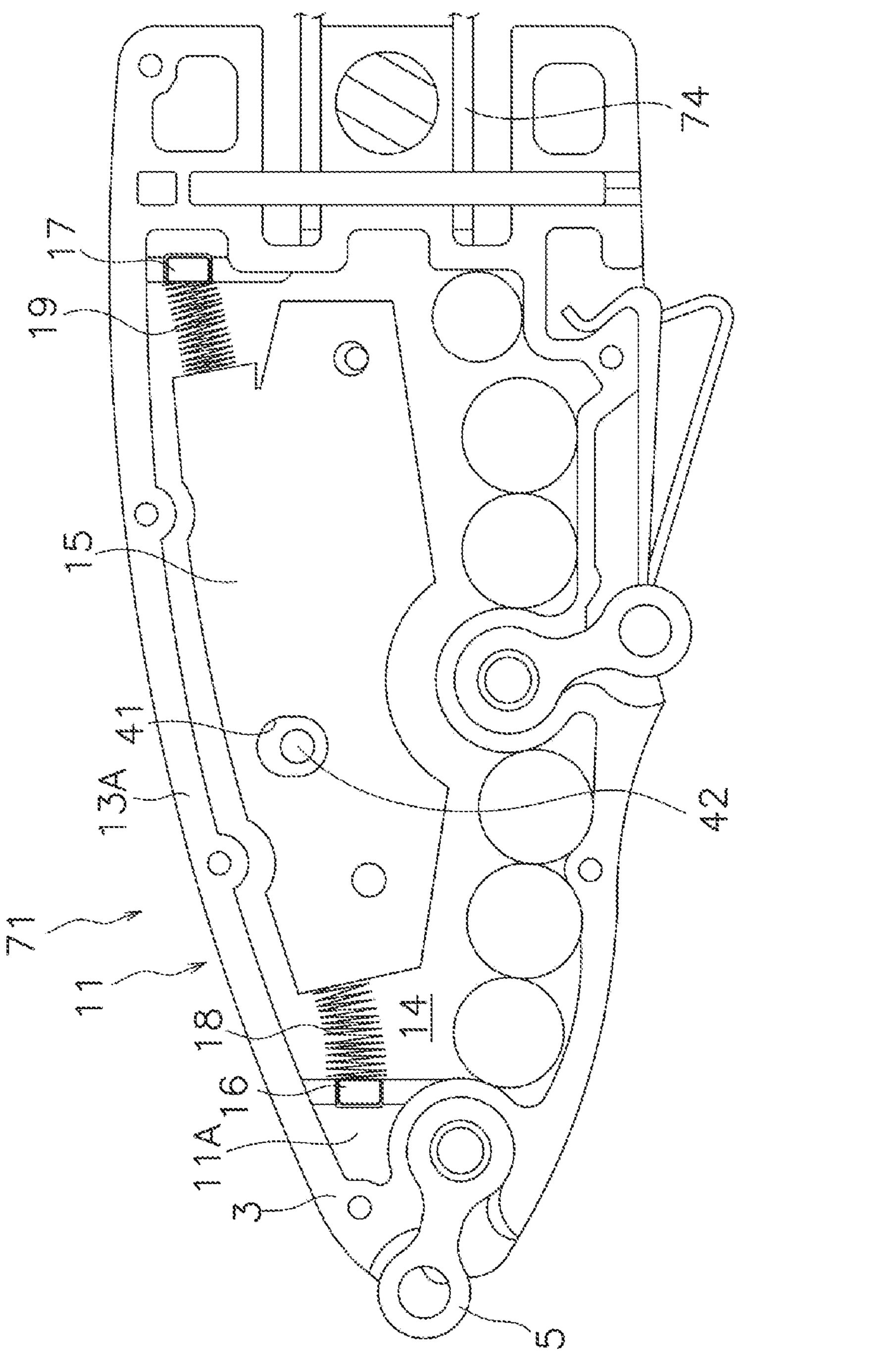
FIG. 14 is a side view of the interior of the lure according to a seventh modified example.

FIG. 14 is a side view showing the interior of the first body portion 71. As shown in FIG. 14, the oscillating element 15, the first shaft portion 16, the second shaft portion 17, the first spring 18, and the second spring 19, which are the same as those in the embodiment described above, are arranged inside the first body portion 71. Configurations that are the same as those of the oscillating element 15, the first shaft portion 16, the second shaft portion 17, the first spring 18, and the second spring 19 can be disposed in the second body portion 72 or the third body portion 73.

The configurations of the above-described first to the sixth modified examples can be applied to the lure 1 according to the seventh modified example. In the lure 1 according to the seventh modified example, the body 2 is divided into three parts. However, the number of divisions of the body 2 can be two, or more than three.

By embodiments of the present invention, it is possible to prevent the hindering of the oscillations of the oscillating element due to the shifted position of the oscillating element when the body is joined.

What is claimed is:

1. A lure, comprising:

a hollow body including a first half-body and a second half-body joined to the first half-body;

an oscillating element disposed in the body so as to be capable of oscillating;

a first shaft portion disposed on at least one of the first half-body or the second half-body and extending toward an other of the first half-body or the second half-body, the first shaft portion including a flat surface on an outer perimeter thereof; and a first spring including a first engagement portion having a straight portion, the straight portion of the first engagement portion being parallel to and engaging the flat surface of the first shaft portion and extending at least partially around the first shaft portion such that engagement between the first shaft portion and the first engagement portion restricts rotation of the first spring about the first shaft portion, the flat surface of the first shaft portion facing in a direction away from a majority of the first spring, and the first spring connected to and supporting the oscillating element such that the oscillating element is capable of oscillating.

2. The lure according to claim 1, further comprising:

a second shaft portion disposed on at least one of the first half-body or the second half-body and extending toward an other of the first half-body or the second half-body, and a second spring including a second engagement portion engaging the second shaft portion such that rotation about the second shaft portion is restricted, and connected to and supporting the oscillating element such that the oscillating element is capable of oscillating.

3. The lure according to claim 2, wherein;

the first spring extends in a first direction and the second spring extends in a second direction, and the first direction and the second direction are arranged non-orthogonally with respect to each other.

4. The lure according to claim 2, wherein:

winding directions of the second spring and the first spring are the same.

5. The lure according to claim 2, wherein:

winding directions of the second spring and the first spring are opposite to each other.

6. The lure according to claim 2, wherein:

the oscillating element is supported by the first spring and the second spring so as be capable of oscillating, such that a time required for one oscillation is a period of 0.1 seconds or more.

7. The lure according to claim 2, wherein:

the first engagement portion is disposed in front of the oscillating element, and the second engagement portion is disposed behind the oscillating element.

8. The lure according to claim 2, wherein:

the first engagement portion is disposed above the oscillating element, and the second engagement portion is disposed below the oscillating element.

9. The lure according to claim 1, further comprising:

a weight attached to the oscillating element.

10. The lure according to claim 1, wherein:

the oscillating element includes a hole with edges, the lure further comprises a protrusion disposed within the body and through the hole, and when the oscillating element is stationary, the protrusion is separated from the edges of the hole.

11. The lure according to claim 1, wherein:

the first shaft portion or the first engagement portion is polygonal in shape.

12. The lure according to claim 1, wherein;

the first shaft portion or the first engagement portion is rectangular in shape.

13. The lure according to claim 1, further comprising:

a weight part disposed in the body and configured to move relative to the body, and a biasing element configured to elastically deform as the weight portion moves and configured to bias the weight portion by elastic restoring deformation, the weight portion moving so as to elastically deform the biasing element at least during casting of the lure.

14. The lure according to claim 1, wherein:

the body includes:

a first body portion, a second body portion separate from the first body portion, and a connecting portion connecting the first body portion and the second body portion.

15. The lure according to claim 1, wherein;

at least part of the body is translucent.

16. The lure according to claim 1, wherein;

the oscillating element is configured to reflect light.

17. The lure according to claim 1, wherein:

the first half-body and the second half-body are joined together by welding.

* * * * *